No. 886,817. PATENTED MAY 5, 1908.
C. A. KELLEY.
MICROMETER GAGE.
APPLICATION FILED JUNE 20, 1907.
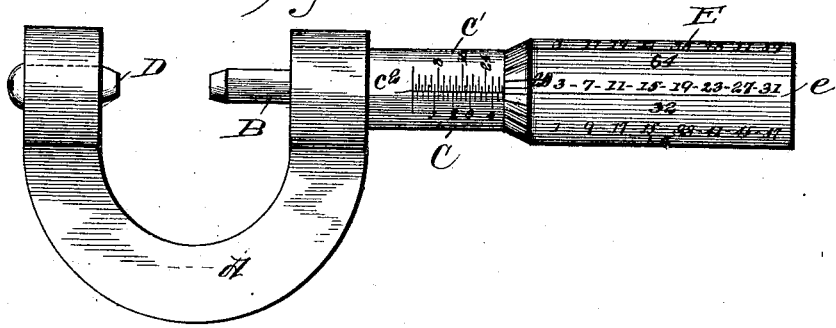
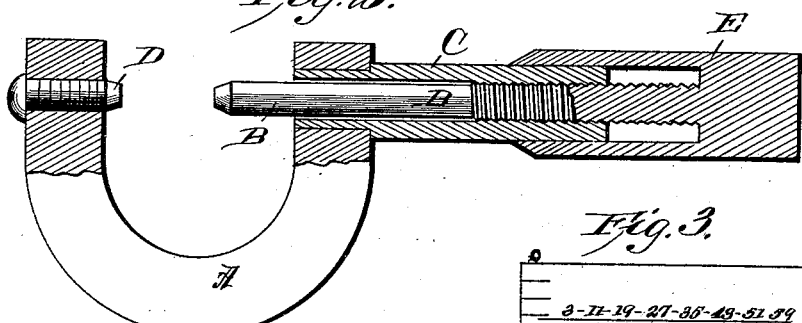
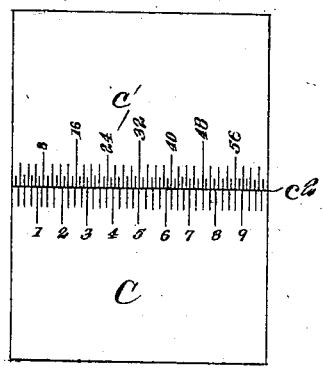
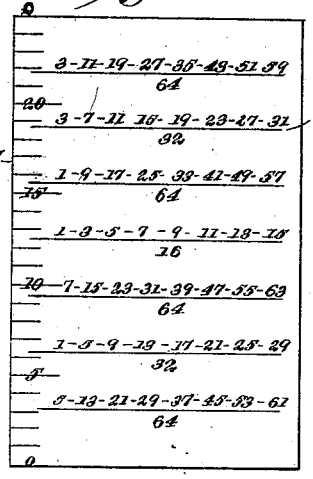
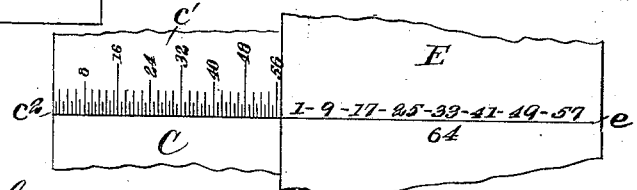
WITNESSES
E. M. Callaghan
Amos W. Hart
INVENTOR
CHARLES A. KELLEY
BY Munn & Co.
ATTORNEYS
THE NORRIS PETERS CO., WASHINGTON, D. C.

UNITED STATES PATENT OFFICE.

CHARLES A. KELLEY, OF SPRING LAKE, MICHIGAN.

MICROMETER-GAGE.

No. 886,817.   Specification of Letters Patent.   Patented May 5, 1908.

Application filed June 20, 1907. Serial No. 379,905.

*To all whom it may concern:*

Be it known that I, CHARLES A. KELLEY, a citizen of the United States, and a resident of Spring Lake, in the county of Ottawa and State of Michigan, have invented an Improved Micrometer-Gage, of which the following is a specification.

My invention is a caliper of that type in which the frame is U-shape and a micrometer screw is adapted to rotate in a nut, or threaded sleeve, fixed in one end of said frame whereby the tip of the screw may be adjusted toward and from the other end of the frame for ascertaining various diameters.

My object is to provide such a caliper or micrometer gage, which is graduated in such manner that it may be read more easily and quickly than others of its class, the graduations being most conveniently expressed in 64ths of an inch upon the rotatable thimble rigidly connected with the micrometer screw constituting one of the gaging points of the instrument.

The features embodying my invention are as hereinafter described, and illustrated in the accompanying drawing, in which Figure 1 is a side view of my improved caliper. Fig. 2 is mainly a longitudinal section of same. Fig. 3 is a plan view of the rotatable thimble as extended in the flat, with the rows of numerals thereon expressing different graduations. Fig. 4 is a plan view of the scales or graduations on the sleeve extended in the flat. Fig. 5 is a diagrammatic view illustrating the method of determining measurements by the use of my improved caliper.

A indicates the U frame, B the micrometer screw, C a sleeve nut, or threaded hub, fixed in one end of said frame and in which the screw is adapted to rotate for adjusting it toward and from the abutment screw D held in the other end of said frame. The screw B is formed integral, or otherwise rigidly connected, with the thimble E whose annular chamber is adapted to receive the sleeve C and is thus adjustable together with the screw B. As such calipers are usually constructed, the pitch of the micrometer screw is forty to the inch, and the sleeve C is graduated correspondingly as at $c$, see Figs. 1 and 4, while the beveled inner end of the thimble E is graduated into twenty-five parts and figured to indicate every five divisions, as 0, 5, 10, 15, 20. Thus, each division when passing the line of graduation on the hub, indicates that the screw has made 1/25 of a turn and the opening of the caliper increases 1/25 of 1/40 or 1/1000 of an inch. Hence, to read such caliper in thousandths of an inch it is necessary to multiply the number of divisions visible on the scale of the hub or sleeve C by 25 and add the number of divisions on the scale of the thimble E from zero to the line coincident with the line of graduations on the sleeve.

I have devised an improvement in such calipers whereby fine graduations may be employed and read instantly without the necessity of any mental calculation. To attain this result I graduate the sleeve C, as indicated in Figs. 1, 4, 5, in 64ths of an inch, and I provide the thimble E with a series of longitudinal lines parallel to its axis and with corresponding rows of numerals which are so related to 64-scale graduations on the sleeve C that any adjustment of the screw B may be instantly read in 64ths or 32nds of an inch, or any multiple of it. The base or first line on the thimble E is indicated and to be known as zero (0), and the other lines are distant from it by regular spaces. Thus the second line is $\frac{1}{8}$ of the circumference of the thimble, the third line $\frac{1}{4}$, the fourth line $\frac{3}{8}$, the fifth line $\frac{1}{2}$ of the circumference, the sixth line $\frac{5}{8}$, the seventh line $\frac{3}{4}$, and the 8th line $\frac{7}{8}$ of the circumference. As is well understood, by turning the thimble E until its beveled end comes exactly over the 64th graduation on the sleeve C one of the long lines indicated on E will coincide with the base line $c^2$ of the graduations on the sleeve, and then by inspection of the numbers extended along the line of the thimble, the exact measurement in 64ths of an inch may be ascertained, and without mental calculation or reference to a conversion table.

While approximate readings in 64ths of an inch may be obtained by the graduations on the sleeve C, as indicated at $c'$, Figs. 1, 4 and 5, as on an ordinary inch scale, the exact readings in 64ths may be obtained only by reference to the graduations indicated in the several rows on the thimble E; see Figs. 1 and 3. There are but eight places on the thimble which coincide with the axial graduation line $c^2$ on the sleeve when any 64th, 32nd, 16th, or 8th is being measured, and each of these eight places is marked with a line, the 64ths, 32nds, 16ths, or 8ths for which that line may be used being marked thereon. Thus, the line on the thimble E which could be used for the exact reading of 15/32 would appear thus:

$$\frac{3-7-11-15-19-23-27-31}{32}$$

That same line then would be used for $$\frac{3}{32} \quad \frac{7}{32} \quad \frac{11}{32} \quad \frac{19}{32} \quad \frac{23}{32} \quad \frac{27}{32} \quad \frac{31}{32}$$

If now it be desired to measure accurately $\frac{15}{32}$, it is first read off on an ordinary inch scale on the sleeve C by rotating the thimble E until its beveled edge comes exactly over that graduation, and then it will be found that the axial line indicated by $e$ (Figs. 1 and 3) on the thimble lies very nearly, or exactly, over the line $c^2$ on the sleeve C. By adjusting the two so that the lines lie exactly together, we have the exact measure of $\frac{15}{32}$, or, what is equivalent, $\frac{30}{64}$. Again, if it be desired to measure $\frac{57}{64}$ of an inch, the thimble E is rotated until its beveled end comes exactly over the graduation next after 56. Then the axial line $e$ on the thimble, see Fig. 5, along which the numerals 1, 9, 17, 25, 33, 41, 49, 57 are arranged will coincide with the line $c^2$.

The new graduations on the thimble are independent of the old ones indicated by numerals zero (0) to 20, and may be used equally well with or without the 40 scale on the hub or sleeve C. There is in no case any mental calculation required for using the instrument in measurement.

What I claim is—

1. The improved micrometer caliper comprising a U frame, an internally threaded sleeve fixed in one end of said frame, a micrometer screw adapted for adjustment in said sleeve, a thimble rigidly connected with the screw and adjustable rotatably on the sleeve, the sleeve having graduations in 64ths of an inch extended along the base line, and a thimble having axial lines dividing it into regular circumferential spaces, and a series of corresponding rows of numerals for all the said lines saving the base or zero line, such numerals indicating fractional parts of an inch in 64ths so that when the thimble is rotated and the screw adjusted for certain measurements, an accurate indication thereof may be instantly read on the thimble on the axial line thereof, which then coincides with the base line $c^2$ of the sleeve, as shown and described.

2. The improved micrometer caliper, comprising a U frame, a sleeve graduated in 64ths of an inch and fixed in one end of said frame, a micrometer screw adjustable in said sleeve, and a thimble integral with the screw and adapted to receive the sleeve, the thimble being provided with longitudinal lines and rows of numerals extending along said lines, the numerals of each row advancing progressively from left to right and indicating fractional portions of the scale on the sleeve, as described.

CHARLES A. KELLEY.

Witnesses:
 WILLIAM G. LELAND,
 JOHN B. PRUIM.